United States Patent
McClendon et al.

(10) Patent No.: US 9,147,061 B1
(45) Date of Patent: Sep. 29, 2015

(54) MULTI-LEVEL AUTHENTICATION

(71) Applicant: Google Inc., Mountain View, CA (US)

(72) Inventors: Brian McClendon, Portola Valley, CA (US); Luc Vincent, Palo Alto, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/290,168

(22) Filed: May 29, 2014

Related U.S. Application Data

(60) Provisional application No. 61/907,482, filed on Nov. 22, 2013.

(51) Int. Cl.
- G06F 21/32 (2013.01)
- G06K 9/32 (2006.01)
- H04L 29/06 (2006.01)
- G06K 9/00 (2006.01)
- H04L 9/32 (2006.01)

(52) U.S. Cl.
CPC ............ G06F 21/32 (2013.01); G06K 9/00261 (2013.01); H04L 9/3231 (2013.01); H04L 63/0861 (2013.01)

(58) Field of Classification Search
CPC ....................................................... G06F 21/32
See application file for complete search history.

(56) References Cited

U.S. PATENT DOCUMENTS

| | | | |
|---|---|---|---|
| 6,301,370 B1 | 10/2001 | Steffens et al. | |
| 7,697,735 B2 | 4/2010 | Adam et al. | |
| 8,085,995 B2 | 12/2011 | Yagnik | |
| 8,457,367 B1 * | 6/2013 | Sipe et al. | 382/118 |
| 8,572,707 B2 * | 10/2013 | Tuchman et al. | 726/7 |
| 2014/0279516 A1 * | 9/2014 | Rellas et al. | 705/44 |

FOREIGN PATENT DOCUMENTS

EP 1580684 A1 9/2005

OTHER PUBLICATIONS

"Hackers Can Easily Bypass Apple's Fingerprint Security", [online], Sep. 23, 2013, <http://www.salon.com/2013/09/23/hackers_can_easily-bypass_apples_fingerprint_security>, 6 pages.

(Continued)

*Primary Examiner* — Gilberto Barron, Jr.
*Assistant Examiner* — Simon Kanaan
(74) *Attorney, Agent, or Firm* — Lerner, David, Littenberg, Krumholz & Mentlik, LLP

(57) ABSTRACT

Aspects of the disclosure relate generally to using a primary and secondary authentication to provide a user with access to protected information or features. To do so, a computing device may generate depth data based on a plurality of images of a user. The computing device may then compare the generated depth data to pre-stored depth data that was generated based on a pre-stored plurality of images. If authentication is successful, the user may be granted access to features of the computing device. If authentication is unsuccessful, then a secondary authentication may be performed. The secondary authentication may compare facial features of a captured image of the user to facial features of a pre-stored image of the user. If authentication is successful, then the primary authentication may be performed again. This second time, the user may be granted access if authentication is successful, or denied access if authentication is unsuccessful.

20 Claims, 10 Drawing Sheets

(56) References Cited

OTHER PUBLICATIONS

Chao Wang, Yongping Li and Xubo Song, Video-to-Video Face Authentication System Robust to Pose Variations, 2013, 14 pages.

Filareti Tsalakanidou, Sotiris Malassiotis and Michael G. Strintzis, Face Authentication Using Color and Depth Images, 30 pages, Aug. 1, 2003.

Johan Hedborg; Motion and Structure Estimation From Video; Linköping May 2012; http://www.diva-portal.org/smash/get/diva2:517601/FULLTEXT01.

Somini Sengupta, Machines Made to Know You, by Touch, Voice, Even by Heart, Sep. 10, 2013, 3 pages.

* cited by examiner

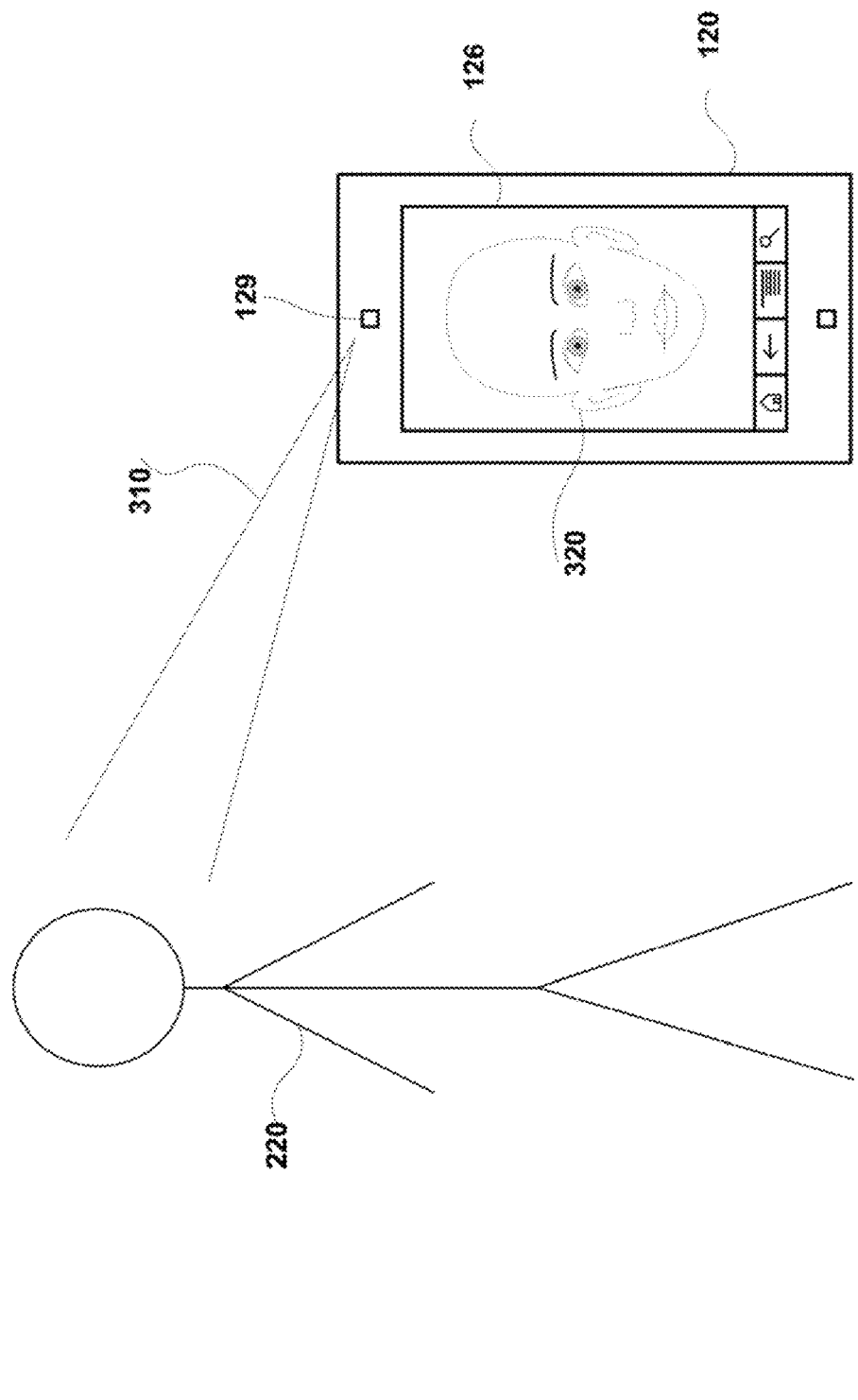

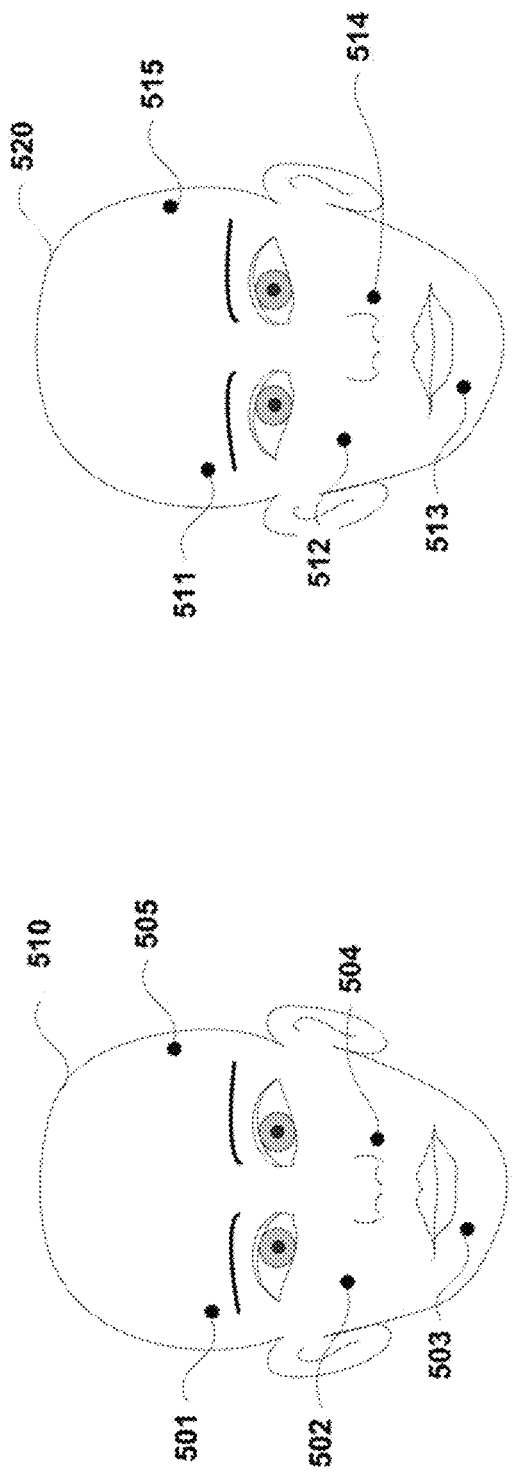

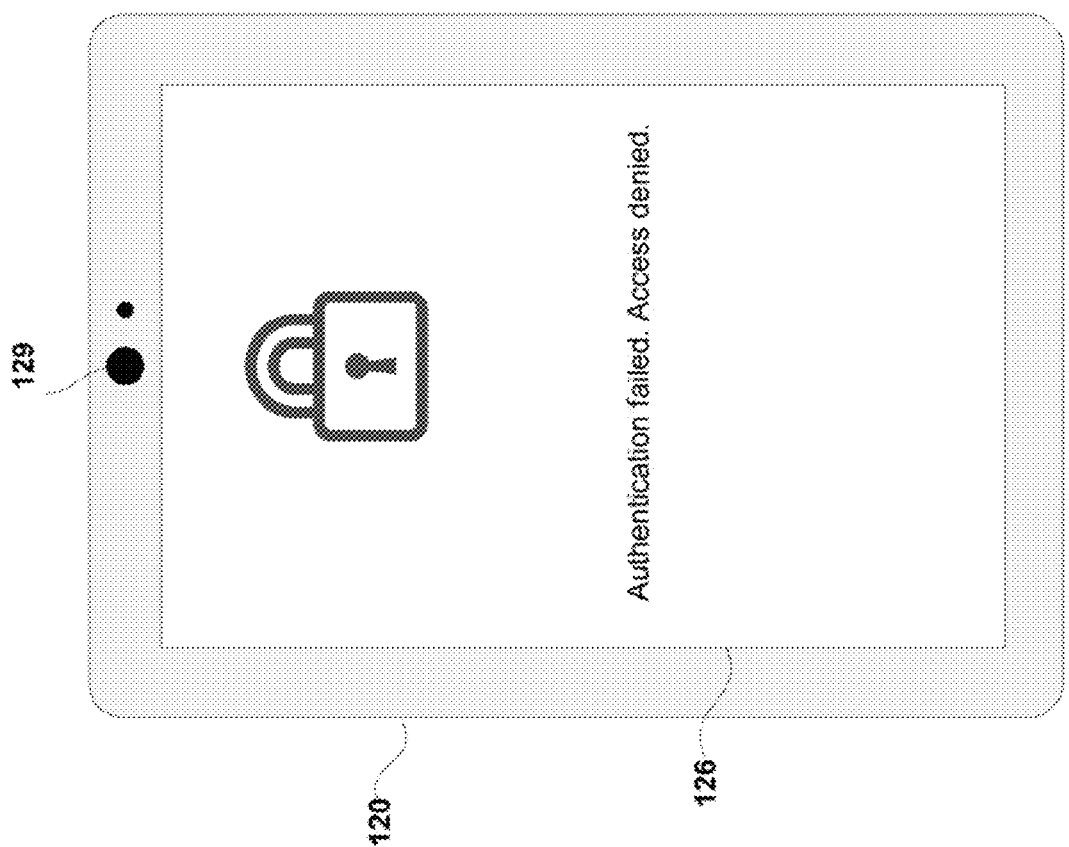

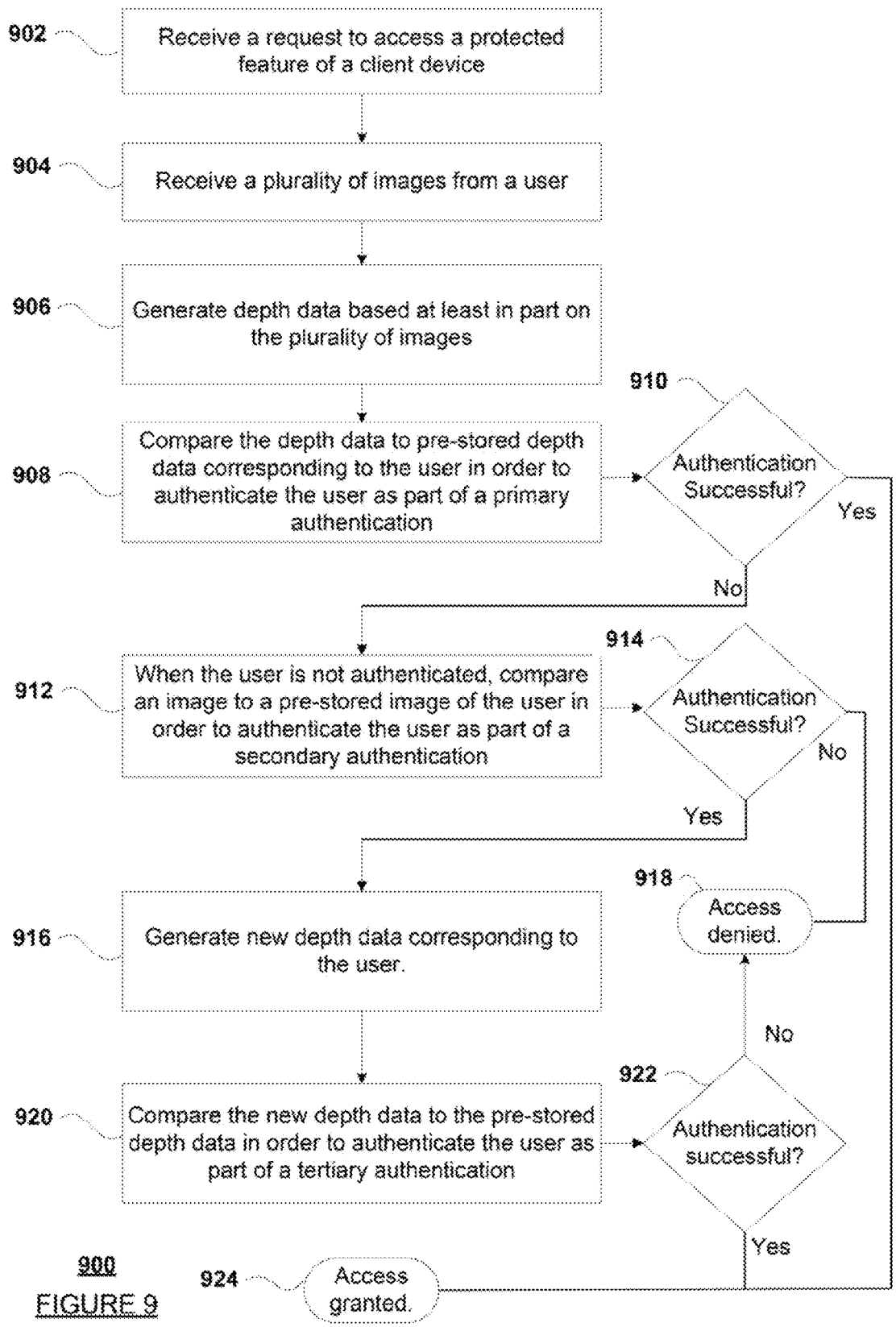

MULTI-LEVEL AUTHENTICATION

CROSS-REFERENCE TO RELATED APPLICATIONS

The present application claims the benefit of the filing date of U.S. Provisional Patent Application No. 61/907,482 filed Nov. 22, 2013, the disclosure of which is hereby incorporated herein by reference.

BACKGROUND

Security systems for computing devices may authenticate a user before providing access to information or features associated with a computing device. For example, some systems implement username and passwords or PIN numbers as a means for authentication. Other systems employ biometrics as a security function through the use of fingerprint verification or facial recognition. However, in some examples, these systems may be bypassed using an image to spoof the authentication.

SUMMARY

Aspects of the disclosure provide a computer implemented system and method. The method includes receiving, by one or more computing devices, a request for access to a protected feature; generating, by the one or more computing devices, depth data based at least in part on a plurality of images; comparing, by the one or more computing devices, the depth data to pre-stored depth data corresponding to the user in order to authenticate the user as part of a primary authentication; when the user is not authenticated as part of the primary authentication, identifying, by the one or more computing devices, a single image; comparing, by the one or more computing devices, the identified image to a pre-stored image of the user in order to authenticate the user as part of a secondary authentication; when the user is authenticated as part of the secondary authentication, generating, by the one or more computing devices, new depth data corresponding to the user; comparing, by the one or more computing devices, the new depth data to the pre-stored depth data in order to authenticate the user as part of a tertiary authentication; when the user is authenticated as part of the tertiary authentication, providing, by the one or more computing devices, access to the protected feature.

In one example, the method also includes the plurality of images are image frames from a captured video. As another example, the new depth data is generated based on the plurality of images. In another example, the method may also include receiving a second plurality of images of the user; and generating the new depth data based on the received second plurality of images. As another example, when the identified single image is not authenticated, denying access to the protected feature of the client device. In another example, when the new generated depth data as part of the tertiary authentication is not authenticated, denying access to the protected feature of the client device. As an additional example, identifying the identified single image includes selecting an image from the plurality of images. In another example, identifying the identified single image includes requesting an image of the user and receiving the single image in response to the request.

Another aspect of the disclosure provides a system comprising one or more computing devices. These one or more computing devices are configured to receive a request for access to a protected feature; generate depth data based at least in part on a plurality of images; compare the depth data to pre-stored depth data corresponding to the user in order to authenticate the user as part of a primary authentication; when the user is not authenticated as part of the primary authentication, identify a single image; compare the identified image to a pre-stored image of the user in order to authenticate the user as part of a secondary authentication; when the user is authenticated as part of the secondary authentication, generate new depth data corresponding to the user; compare the new depth data to the pre-stored depth data in order to authenticate the user as part of a tertiary authentication; when the user is authenticated as part of the tertiary authentication, provide access to the protected feature.

In one example, the plurality of images are image frames from a captured video. As another example, the new depth data is generated based on the plurality of images. Furthermore, in another example the system may receive a second plurality of images of the user; and generate the new depth data based on the received second plurality of images. As another example, when the identified single image is not authenticated, denying access to the protected feature of the client device. In another example, when the new generated depth data as part of the tertiary authentication is not authenticated, denying access to the protected feature of the client device. As another example, identifying the identified single image may include selecting an image from the plurality of images. In another example, identifying the identified single image includes requesting an image of the user and receiving the single image in response to the request.

BRIEF DESCRIPTION OF THE DRAWINGS

FIG. 3 is an example of a computing device capturing a user's face in accordance with aspects of the disclosure.

FIGS. 5A-B are examples of pixel data and images in accordance with aspects of the disclosure.

FIG. 8 is an example of a computing device and authentication in accordance with aspects of the disclosure.

FIG. 9 is a flow diagram in accordance with aspects of the disclosure.

DETAILED DESCRIPTION

Overview

Figure 1:
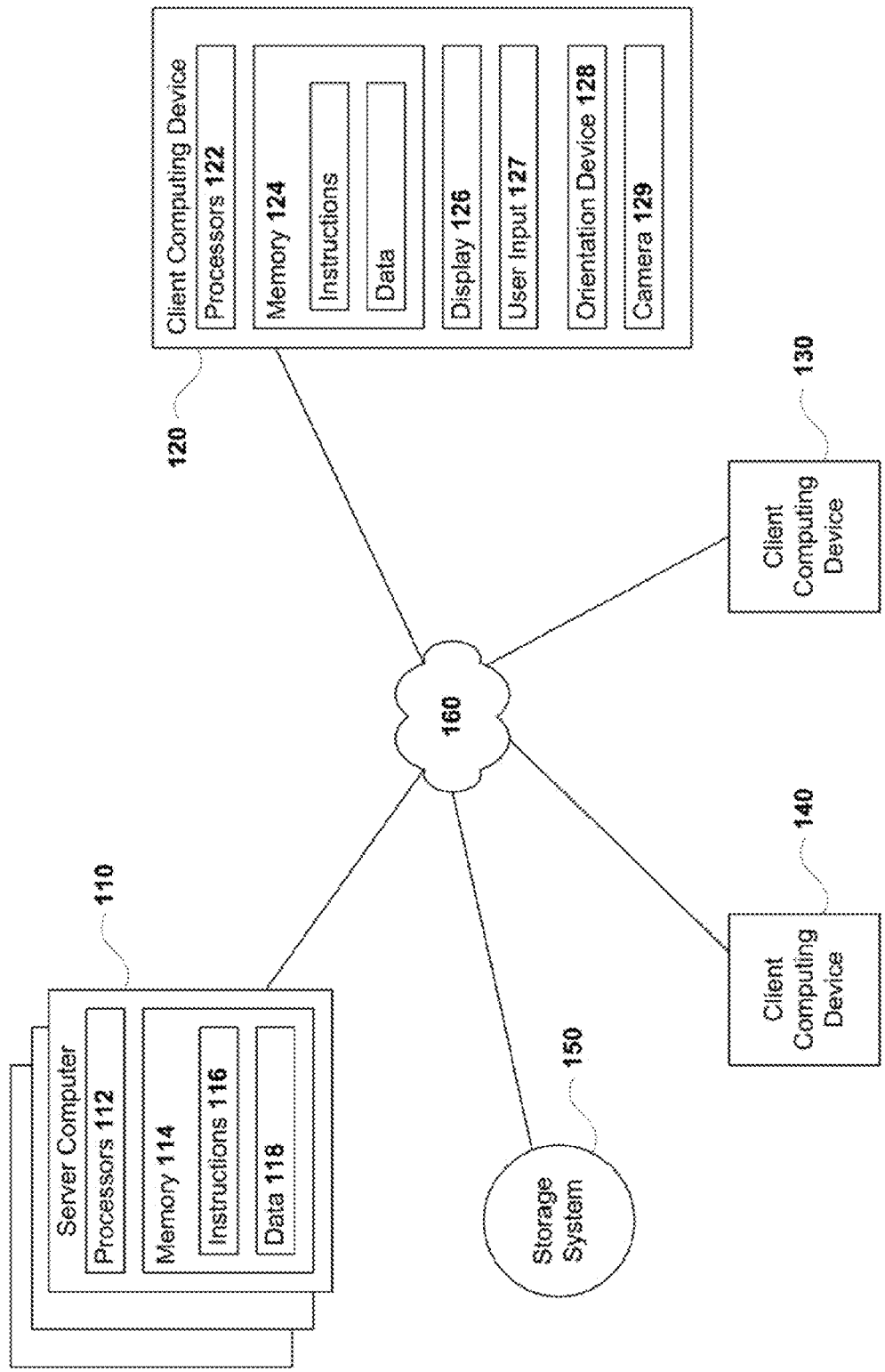
FIG. 1 is a functional diagram of an example system in accordance with aspects of the disclosure.

Aspects of the technology discussed herein employ facial recognition as a security measure in providing access to information or features associated with a computing device. For example, aspects of the disclosure may be used in order to prevent unauthorized access to certain features, applications, confidential information, personal information, etc. stored on a device or remotely. In one instance, a user may record a video of his or her face on a mobile computing device, such as a cellular phone, to "unlock" or access protected information or features stored at the phone. The user may simply move a mobile computing device around, and the mobile computing device responds by automatically determining if the user has authorization to access the protected materials using an authentication process. If so, the user is provided access; if not, the user is denied access.

In one example of a primary authentication, a user may request access to some protected information or features. In response, the computing device may require the user to capture a video of their face. To capture the video, the user may move the camera in different directions.

After capturing the video, a primary authentication may be performed using the video. In some examples, the primary authentication may include generating three-dimensional depth data from the video using the various frames captured by the mobile computing device. Data from depth sensors, three-dimensional (3D) scanners, and or structure from motion from a video of the user may be used to generate the depth data including a plurality of 3D points. When the video includes images of the user's face, the 3D points may correspond to the shape of the user's face. In addition, greater video length may provide more frames which may then be used to generate more 3D points for the depth data.

Before or after depth data is generated, pre-stored three-dimensional depth data may be retrieved from local or remote storage. The pre-stored depth data may be stored, for example, on the device as part of an initial security set-up for the device, an application, or the protected features or information. The pre-stored depth data may include a plurality of 3D points derived from a first video that the user captured of himself or herself. Like the generated depth data, the pre-stored depth data may have been generated using data from orientation and/or geographic location devices such as an accelerometer or gyroscope.

Using the generated and pre-stored depth data, a primary authentication may be performed by comparing the generated depth data with the pre-stored depth data. Comparing the depth data may include, for instance, comparing three-dimensional points from the generated depth data with three-dimensional points from the pre-stored depth data in order to authenticate the user. Authentication of the user may depend on the accuracy and reliability of the authentication analysis. The accuracy and reliability may depend on the algorithm being implemented, and whether or not that accuracy and reliability satisfy a given threshold. If the generated depth data is authenticated, then the user will be allowed access to the information or features associated with the computing device. The determination and comparison of the generated and pre-stored depth data may occur on the mobile computing device and/or on one or more computing devices distinct from the user's mobile device (e.g., on a server computing device). If the generated depth data is authenticated, then the user may be granted access to the mobile computing device.

Because three-dimensional depth data is compared instead of only two-dimensional (2D) images, a more comprehensive comparison may be performed. This may prevent an unauthorized user from attempting to use a static image of the user held in front of the camera to access the protected data or materials.

If the generated depth data is not authenticated, then a secondary authentication may be implemented. In one example, this secondary authentication may include comparing a single image of the user, such as an actual image or an image frame selected from the video, to a pre-stored image. Before or after the single image frame is selected from the video, the pre-stored image may be retrieved from local storage. The pre-stored image may have been stored, for example, on the device as the initial set-up for the authentication process. Similar to the pre-stored video, the pre-stored image may be stored, for example, on the device as part of an initial security set-up for the device, an application, or the protected features or information. The pre-stored image may have also been selected from the pre-stored video, similar to the single image frame.

After selecting the single image and the pre-stored image, the images may be compared as part of a secondary authentication of the user. For example, a comparison between the single image and the pre-stored image may be performed by various feature matching techniques that may include identifying and comparing features of a user's face, such as the relative size and arrangement of the nose and eyes, etc. These feature matching techniques may use pixels associated with both images. In some examples where an image frame of the video is used, additional image frames from any portion of the video may also be used for comparison with pre-stored images as part of the secondary authentication. If the single image frame is not authenticated (or other secondary authentication is not successful), then the user may be denied access to the protected information or feature of the device.

When the secondary authentication requires less time and processing power than the primary authentication, the secondary authentication may allow the user to be denied access to features of a device quicker than if the primary authentication was performed a second time. This is the case when comparing 2D images as a secondary authentication and comparing 3D depth data as a primary authentication.

If the single image is authenticated, then the primary authentication may be performed a second time. This second time, a user may capture a second video of himself or herself. New depth data is generated and compared with the pre-stored depth data. Alternatively, the new depth data may be generated from the original video and compared with the pre-stored depth data. If the new depth data generated from a new video or the original video is authenticated, then the user may be granted access to features of the device. If the new depth data is not authenticated, then the user may be denied access to the device.

In other embodiments, the primary or secondary authentication may include one or more of the entry of a username, entry of a password responding to one or more security questions, using fingerprint or other biometric authentication.

In addition, rather than the pre-stored image or depth data being stored on the user's device, the image or video may be stored remotely. In this regard, the primary and/or secondary authentication described above may be performed remotely, for example, by a server computing device. The pre-stored depth data and/or pre-stored image or images may also be sent to the mobile computing device as needed for primary and/or secondary authentication.

Example Systems

Figure 2:
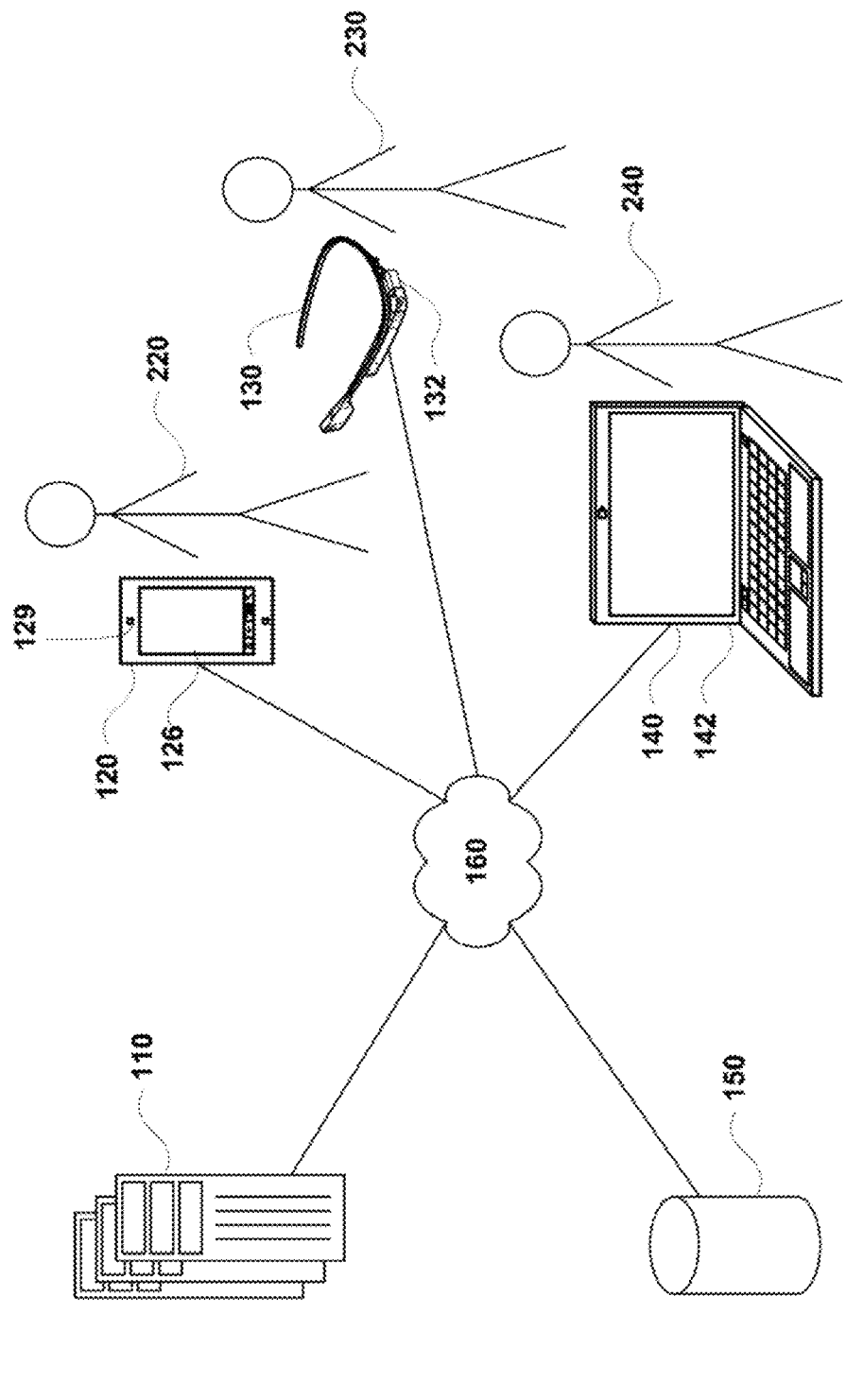
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, 130, and 140 as well as storage system 150. Each of the computing devices 110, 120, 130, and 140 can contain one or more processors 112, memory 114 and other components typically present in general purpose computing devices. Memory 114 of the computing devices can store information accessible by one or more processors 112, including instructions 116 that can be executed by the one or more processor 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processor, such as a commercially available CPU. Alternatively, the processor can be a dedicated component such as an ASIC or other hardware-based processor. Although not necessary, one or more of computing devices 110 may include specialized hardware components to perform specific computing processes, such as decoding video, matching image frames with images, distorting videos, encoding distorted videos, etc. faster or more efficiently.

Although FIG. 1 functionally illustrates the one or more processors, memory, and other elements of the computing devices 110 as being within the same block, the processor, computer, computing device, or memory can actually comprise multiple processors, computers, computing devices, or memories that may or may not be stored within the same physical housing. For example, the memory can be a hard drive or other storage media located in a housing different from that of computing device 110. Accordingly, references to a processor, computer, computing device, or memory will be understood to include references to a collection of processors, computers, computing devices, or memories that may or may not operate in parallel. For example, the computing device 110 may include a single server computing device or a load-balanced server farm. And although some functions described below are indicated as taking place on a single computing device having a single processor, various aspects of the subject matter described herein can be implemented by a plurality of computing devices, for example, communicating information over a network 160.

The computing devices 110 can be at nodes of a network 160 and capable of directly and indirectly communicating with other nodes of network 160. Although only a few computing devices are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, one or more computing devices 110 may include a web server that is capable of communicating with storage system 150 as well as computing devices 120, 130, and 140 via the network. For example, one or more of server computing devices 110 may use network 160 to transmit and present information to a user, such as user 220, 230, or 240, on a display, such as displays 126, 132, or 142 of computing devices 120, 130, or 140. In this regard, computing devices 120, 130, and 140 may be considered client computing devices and may perform all or some of the features described herein.

Each of the client computing devices may be configured similarly to the server computing devices 110, with a processor, memory and instructions as described above. Each client computing device 120, 130 or 140 may be a personal computing device intended for use by a user 220, 230, 240, and have all of the components normally used in connection with a personal computing device such as a central processing unit (CPU), memory (e.g., RAM and internal hard drives) storing data and instructions, a display such as displays 126, 132, or 142 (e.g., a monitor having a screen, a touch-screen, a projector, a television, or other device that is operable to display information), and user input device 127 (e.g., a mouse, keyboard, touch-screen or microphone). The client computing device may also include a camera 128 for recording video streams or capturing a single image, speakers, a network interface device, and all of the components used for connecting these elements to one another. The client computing device may additionally include an orientation device to determine changes in orientation as the computing device moves.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

The computing devices may also include a geographic position component in communication with the one or more processors for determining the geographic location of the device. For example, the position component may include a GPS receiver to determine the device's latitude, longitude and/or altitude position. The location of the device may include an absolute geographical location, such as latitude, longitude, and altitude as well as relative location information, such as relative to a particular device or object.

The computing devices may also include other devices in communication with one or more processors, such as an accelerometer, gyroscope or another orientation detection device to determine the orientation of the client device or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, various computing devices, other computers, and combinations of the foregoing.

As with memory 114, storage system 150 can be of any type of computerized storage capable of storing information accessible by one or more of server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected or incorporated into any of the computing devices 110-140 (not shown).

Storage system 150 may store authentication information including images, depth data, PIN numbers, usernames, passwords, and fingerprint information. In addition, the storage system 150 may store protected data, applications, and personal or sensitive information.

In situations in which the systems discussed here collect personal information about users, or may make use of personal information, the users may be provided with an opportunity to control whether programs or features collect user information (e.g., such as an image, video or depth information of the user), to control whether and/or how this information is used. In addition, certain data may be treated in one or more ways before it is stored or used, so that personally identifiable information is removed. For example, a user's identity may be treated so that no personally identifiable information can be determined for the user. Thus, the user may have control over how information is collected about the user and used by a content server.

Example Methods

A user may request access to some protected information or features. For instance, a user 220 may request access to or to unlock a client computing device 120. As noted above, the client computing device 120 may be a mobile device, desktop, laptop, etc. Alternatively, a user 220 may request access to a particular application or information stored at a client computing device 120. As another alternative, the user 220 may attempt to "wake up" the computing device from sleep mode, idle mode, etc.

In response to the user's request, the computing device, by way of an authentication application, may prompt the user to capture a video. For example, a prompt may appear on the display 126 that requests that the user 220 capture a video of himself or herself using the client computing device 120's camera 129. As another example, the camera 129 may start recording without any prompt to the user 220.

When the client device prompts the user to record a video, the user may choose whether to record the video. For example, once the user 220 is prompted and he or she chooses a "yes" option, a "record" option, or the like, recording may begin. Alternatively, if the user 220 does not choose to begin recording, then the computing device may not record a video.

Figure 4A:
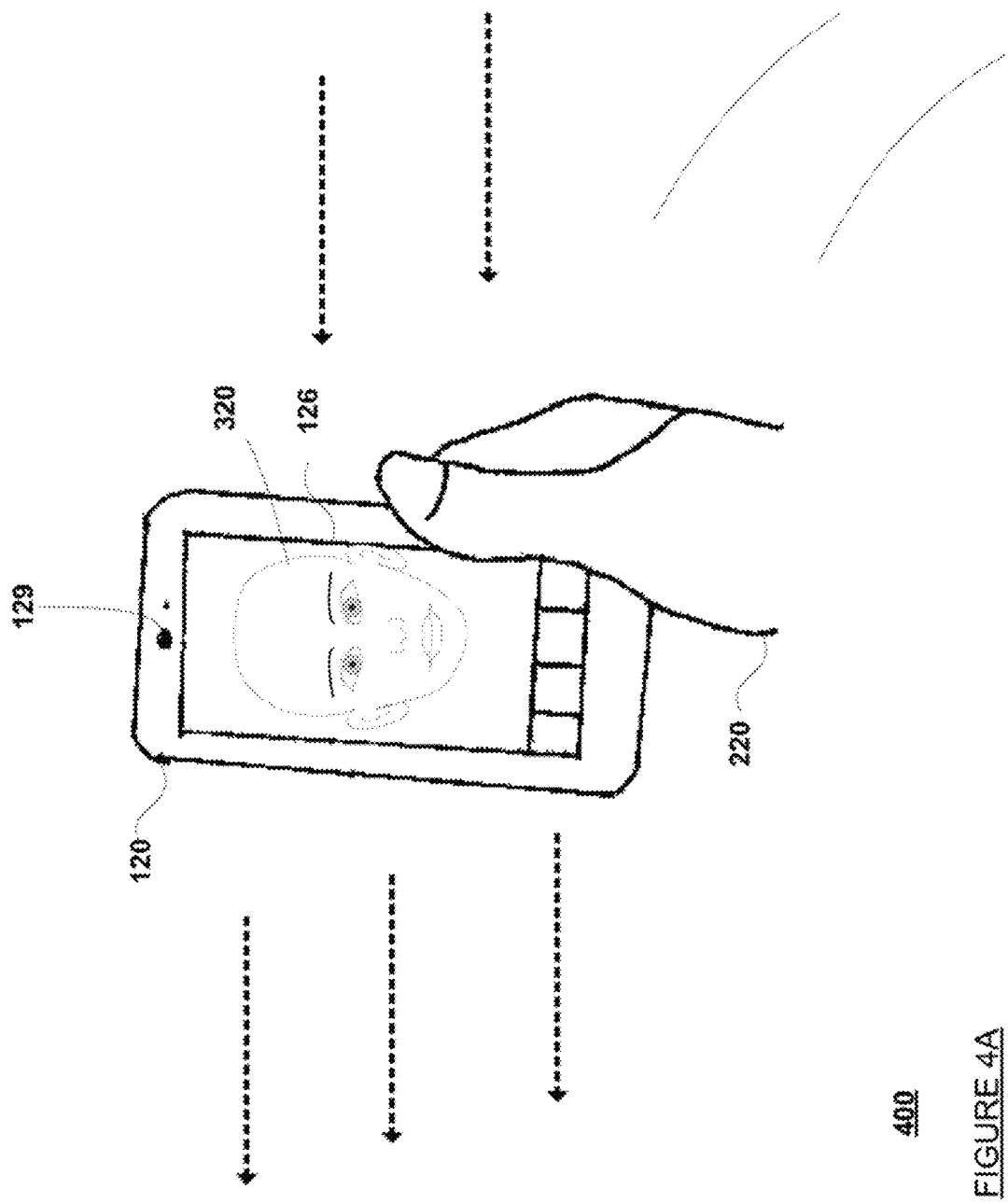
FIGS. 4A-B are examples of a user moving a computing device in accordance with aspects of the disclosure.
Figure 4B:
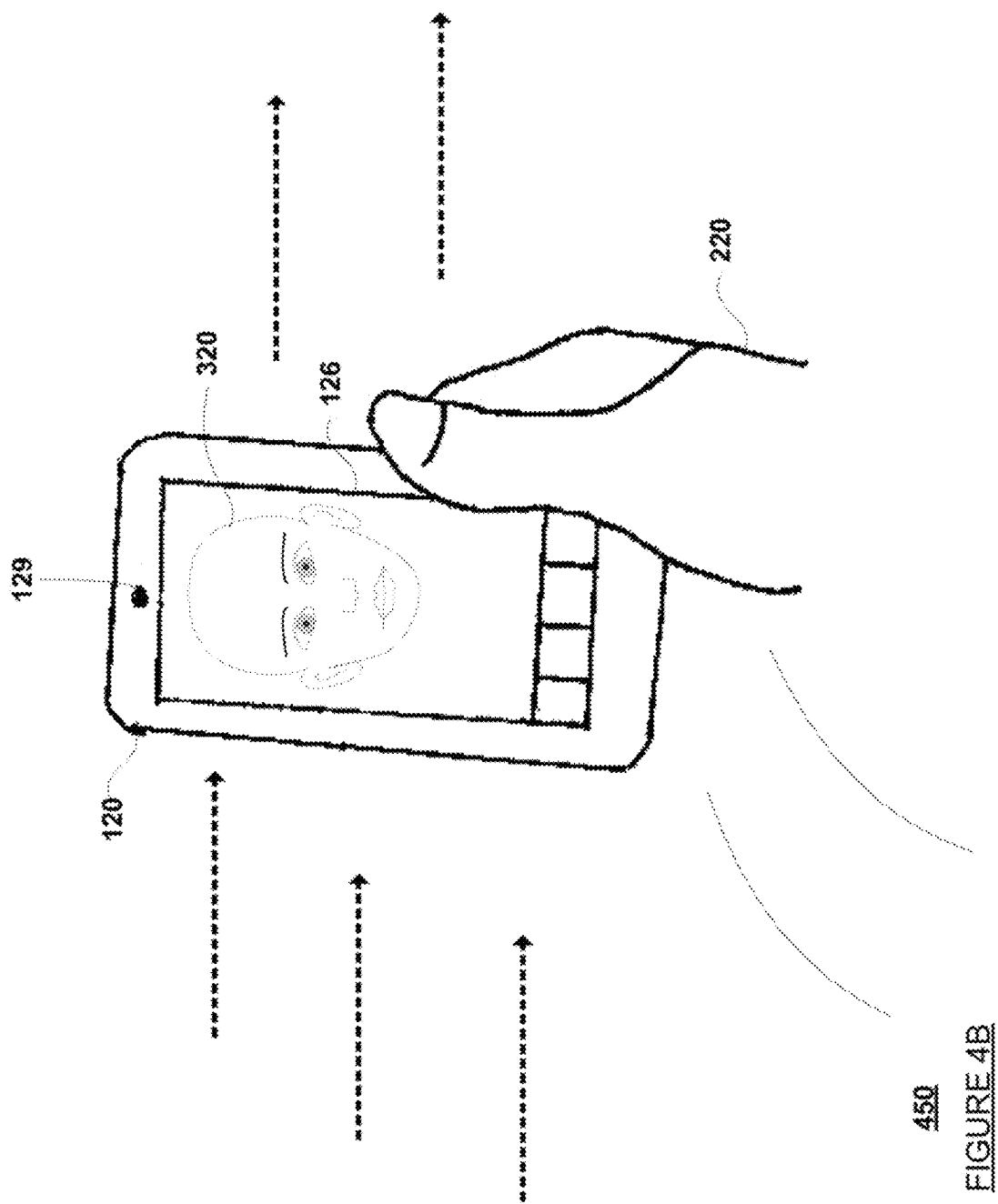

While recording the video, the user may move the client computing device in various directions in order to capture some portion of the user. As an example the video may be only a few seconds or more. FIG. 3 is an example 300 of client computing device 120 capturing 310 a recording 320 of user 220 for presentation on display 126. FIG. 4A is an example 400 of user 220 moving the client computing device 120 left, as shown by the directional arrows, while recording their face with the camera 129. FIG. 4B is an example 450 of a user 220 moving the client computing device 120 right, as shown by the directional arrows, while recording their face with the camera 129. Alternatively, any other direction of movement for presentation on display 126 may be adequate.

After the video is recorded, depth data for a 3D model of a plurality of 3D points of the user's face may be generated. For example, any known structure by motion techniques may be used to generate a 3D model of the user's face. For instance, structure from motion techniques may allow for the creation of a 3D model through the use of two-dimensional images by analyzing the various camera poses and the shape of the object in various frames of the video to develop the 3D structure of the user.

The various frames of the video may be processed to identify 3D points corresponding to the user. In addition, data from one or more of a geographic position device, accelerometer, gyroscope, etc. may also be used. As the video may include portions of a user's face, the 3D points may correspond to the user's nose, eyes, ears, cheeks, or other detectable features. FIG. 5A is an example 500 of generated depth data for User X. For instance, depth data 501-510 are examples of 3D points corresponding to User X's face. Pre-stored depth data may be retrieved before or after the depth data is generated.

The pre-stored depth data may have been generated as part of an initial set-up of the authentication application. For example, as part of the set-up of an authentication application, the application may prompt the user to capture an initial video. In response, the user records a video of his or herself. Referring back to examples 400 and 450 of FIGS. 4A and 4B, the user may have moved the camera from left to right and/or right to left while recording him or herself.

The initial video may then be used to generate depth data that is stored for later authentication purposes. Similar to the generated depth data, data from one or more of a geographic position device, accelerometer, gyroscope, etc. may be used in conjunction with the pre-stored video to generate depth data including a plurality of 3D points that correspond to the user's face. For example, the 3D points may correspond to the user's nose, eyes, ears, cheeks, etc. FIG. 5B is an example 550 of pre-stored depth data for User X. For instance, depth data 511-520 are examples of 3D points corresponding to the relative location of points on User X's face. This generated depth data may then be stored, either locally or remotely, to authenticate the user as part of the authentication application in the future. Thus, this depth data may be referred to as pre-stored depth data.

The pre-stored depth data may be compared to the generated depth data as part of a primary authentication. For example, the relative locations of 3D points may be compared. As an example, the generated depth data of FIG. 5A may be compared to the pre-stored depth data of FIG. 5B. Here, 3D point 501 of the first frontal view 510 may be compared with 3D point 511 of the second frontal view 520. As another example, 3D point 502 of the first frontal view 510 may be compared with 3D point 512 of the second frontal view 520.

In addition, a plurality of 3D points may be compared between the generated and pre-stored depth data. For example, each of 3D points 501-505 of the first frontal view 510 may be compared with each of 3D points 511-515 of the second frontal view 520. Comparing a plurality of points may create a more comprehensive assessment of the user's face, thereby increasing security for the computing device, data, or protected or sensitive information. Alternatively, anywhere from one 3D point to substantially more 3D points may be used for comparison.

In comparing the pre-stored and generated depth data, the client computing device may determine whether the compared depth data sufficiently match for the primary authentication. For example, the generated depth data may be authenticated if the location of 3D point 501 sufficiently corresponds to the location of 3D point 511. The determination and comparison of the depth data may take place locally or remotely from the device that captured the video. For example, the generated depth data may be compared to the pre-stored depth data on the client computing device 120. The video and/or generated depth data may also be sent over the network 160 to one or more server computing devices 110. The one or more server computing devices 110 may access the storage system 150 to retrieve the pre-stored video. The one or more server computing devices 110 may then generate the depth data (if needed) and/or perform the depth data comparison between the generated and pre-stored depth data. The one or more server computing devices 110 may then send a response to the client computing device 120, indicating whether authentication was successful or unsuccessful.

In some instances, there may be an error value that indicates the accuracy and/or reliability of the performed authentication. This error value may be a value (e.g., number, percentage, etc.) that indicates how reliable or accurate the authentication determination is. The error value may be compared to a threshold value to determine whether or not to provide access to a user. If the error value indicates, for example, an 85% likelihood of accuracy and/or reliability of authentication, then the computing device may determine that the user is properly authenticated. However, if the percentage is, for example lower than 85%, then the computing device may determine that the user has not been properly authenticated. The threshold value for a successful authentication may be a predetermined value (e.g., number, percentage, etc.).

Figure 6:
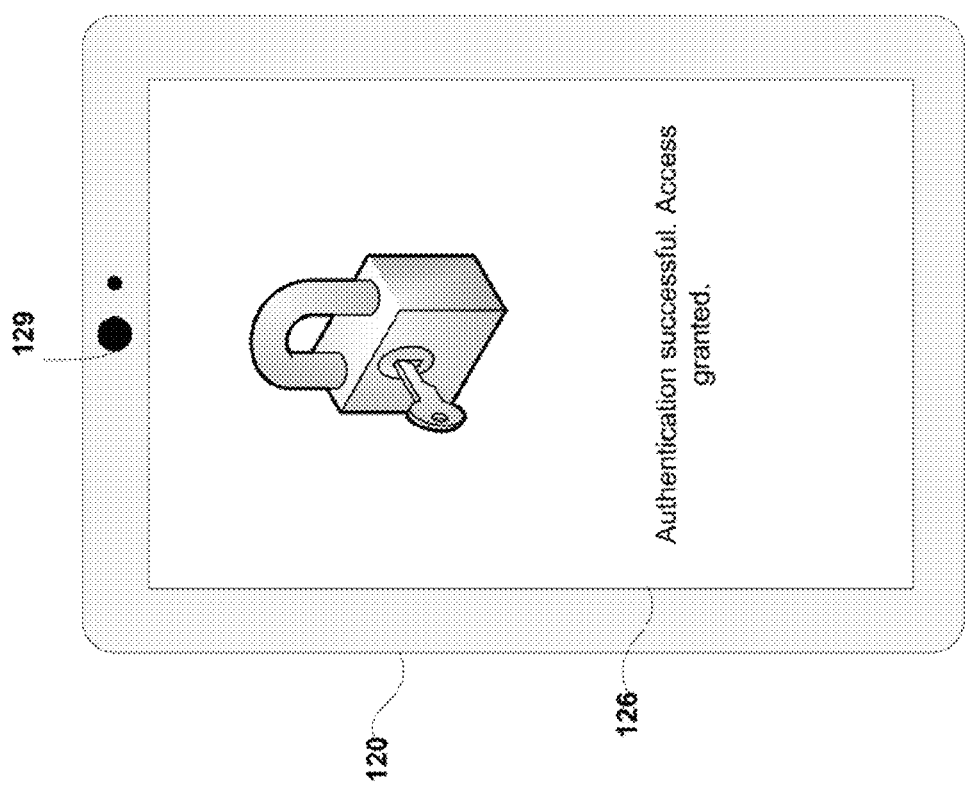
FIG. 6 illustrates a client device and screen shot in accordance with aspects of the disclosure.

If the generated depth data is authenticated, then access to the protected information or features may be granted. FIG. 6 is an example 600 of a message that may be displayed on the client computing device 120 when the primary authentication is successful. In this example, the message may notify the user that the authentication has succeeded and access to the requested protected information or features has been allowed. In some examples, if the user was attempting access to a particular application or personal information, a similar message may be conveyed by the client computing device.

Figure 7A:
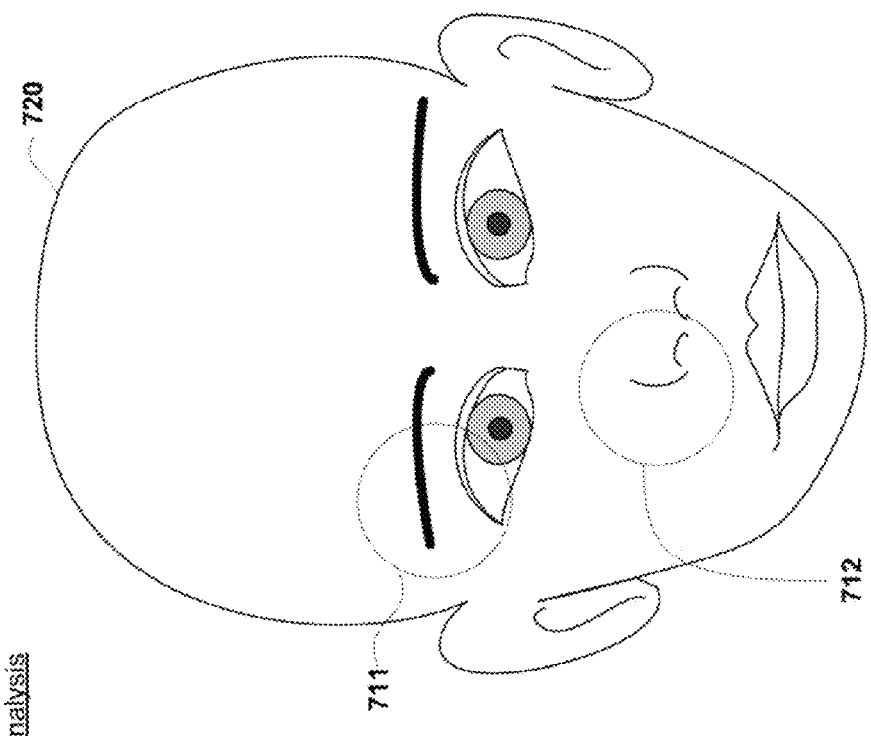
FIGS. 7A-B are examples of depth data in accordance with aspects of the disclosure.

If the generated depth data is not authenticated, a secondary authentication may be performed. In one example, a single image frame may be selected from the video. As another example, the single image may be a separate image captured from the camera. FIG. 7A is an example 700 of a selected single image frame from the video. By way of example, the single image frame may be the first frame, last frame, or any frame in between (e.g., the $10^{th}$ frame in the video). Alternatively, the single image frame may be obtained at a particular timing interval of the video. For instance, the single image frame may be captured at some time, such as 0.5 seconds (or more or less), into the video.

Before or after the single image is selected, a pre-stored image may be retrieved. For example, a pre-stored image may be stored locally in memory 124, from which the one or more processors 122 may retrieve the pre-stored image. Alternatively, the pre-stored image may be stored in the computing device's cache memory for quicker retrieval.

The pre-stored image may be stored at and retrieved from a remote location. For example, the client computing device 120 may send a request over a network 160 to one or more server computing devices 110. From there, the one or more server computing devices 110 may access a storage system 150 for the pre-stored image and send the pre-stored image over the network 160 to the client computing device 120.

Figure 7B:
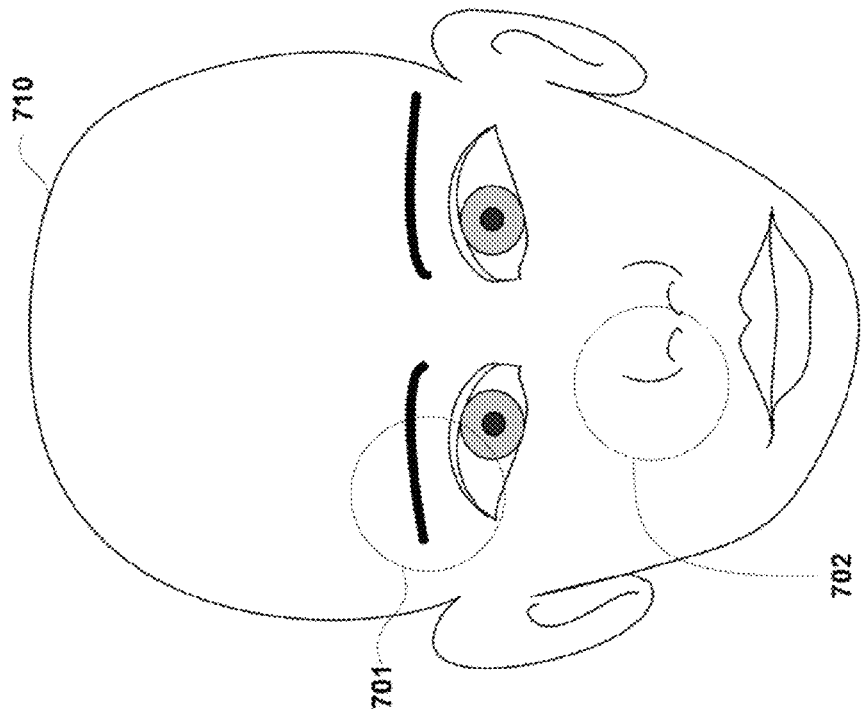

The pre-stored image may have been stored on the device as an initial set-up for the authentication application. For example, similar to the initial set-up of the pre-stored video, the user may have been prompted to capture an image of himself or herself in order to activate the secondary authentication feature. In another example, the user may have had the option to activate the secondary authentication feature, which would then prompt the user to capture the image using the client computing device's camera. In another example and similar to the single image discussed above, the pre-stored image may be a frame from the initial video that was selected by the client computing device. As one example, FIG. 7B is an example 750 of a selected pre-stored image from the pre-stored video. By way of example, the pre-stored image may be the first frame, last frame, or any frame in between. For instance, the image may be the $10^{th}$ frame in the video. Alternatively the image may be obtained at a particular timing interval of the video. For instance, the pre-stored image may be captured at some time, such as 0.5 seconds (or more or less), into the video. Once the image is acquired by any of the methods described above, the image may be stored either locally or remotely. Thus, the image may be referred to as the pre-stored image.

After a single image frame is selected and a pre-stored image is retrieved, the images may be compared. The comparison may be performed on a feature basis, meaning features associated with the faces in both images may be identified and compared. By way of example only, the feature comparison may be performed by evaluating features at different points on a face. As another example, a variety of features throughout the images may be compared, such as pores on the skin, batches of hair on the face, and the like. The comparison, however, may include any combination of comparing individual features or a plurality of features.

In comparing the features of the face, the computing device may determine whether the compared features sufficiently match for authentication of the single image frame. Facial recognition techniques may generally rely on matching methods and processes. For example, by comparing particular features of a face such as the nose, eyes, and mouth. In addition, the higher the level of resolution of the images, the more detailed the comparison may be. As another example, the texture of the user's skin may be analyzed and compared as well, such as pores, moles, and hairless patches on the face. Depending on the resolution of the images, an iris analysis may be performed. In another example, algorithms may be used such as Elastic Bunch Graph Matching, Principal Component Analysis, or the like.

Examples of facial recognition matching techniques that may be used as described herein are presented in the following disclosures: U.S. Publication No. 6,301,370 B1 filed Dec. 4, 1998 and entitled "Face Recognition from Video Images," the entire disclosure of which is incorporated herein by reference; E.P Publication No. 1,580,684 filed Apr. 12, 1998 and entitled "Face Recognition from Video Images," the entire disclosure of which is incorporated herein by reference; U.S. Publication No. 8,085,995 filed Dec. 1, 2006 and entitled "Identifying Images Using Face Recognition," the entire disclosure of which is incorporated herein by reference; and U.S. Publication No. 7,697,735 filed Jun. 21, 2005 and entitled "Image Based Mutli-biometric System and Method," the entire disclosure of which is incorporated herein by reference.

As an example, the image frame of FIG. 7A may be compared to the pre-stored image of FIG. 7B to determine whether the persons in the images match (e.g., are the same or substantially similar according to any of the facial recognition matching techniques listed above). For example, based on the resolution of the images, features of the faces in both images may be compared. As one example, the feature comparison may be performed by processing the pixels of the images to identify particular features of the face, such as on the nose, eyes, or ears. For instance, feature 701 corresponding to the eyebrow and eye may be compared to feature 711, also corresponding to the eyebrow and eye of the user. A similar comparison may be performed on features 702 and 712 corresponding to the nose of User X. More specifically, features 701 and 711 may include analyzing skin tone, a scar, or a freckle. In this regard, the feature comparison may determine whether features 701 and 711 are the same or substantially similar.

If the persons in the images do not match, for example, according to any of the facial recognition matching techniques listed above, then the secondary authentication may fail or be unsuccessful. For example, if features 701 and 711 do not match as described above, then the authentication may be unsuccessful. Alternatively, the user 220 may not be authenticated if a threshold amount of characteristics associated with the features were found to not match. As a result of the failed secondary authentication, an access denied message may be displayed on the user's display 126 as shown in example 800 of FIG. 8.

This comparison of the images as part of the secondary authentication may take place locally, or remotely from, the device that captured the image or video. For example, the features of the single image frame 710 may be compared to the features of the pre-stored image 720 directly on the client computing device 120. Alternatively, the image frame 710 may be sent over the network 160 to one or more server computing devices 110. As with the examples above, server computing device 110 may access the storage system 150 to retrieve the pre-stored image 720. Thereafter, one or more server computing devices 110 may perform the feature comparison and authentication of the image frame 510. The one or more server computing devices 110 may send a response to the client computing device 120, indicating whether authentication was successful or unsuccessful.

The secondary authentication may be considered an efficient back-up authentication mechanism to more quickly confirm the user is not authenticated and then deny access to a user deny access to a user than if the primary authentication were repeated. For example, comparison of two images may be quicker than the generation of depth data and a comparison of two sets of depth data. In addition, the depth data comparison may not be as accurate and reliable as the image comparison, so if a user fails the image comparison, then it is unlikely the user can pass the depth data comparison on a second try. Therefore, the implementation of the image comparison in the secondary authentication will more efficiently reject the user.

If the secondary authentication is successful, then the primary authentication may be performed again as a tertiary authentication by generating new depth data. This new depth data may be generated from the video, or the user may be required to take a second video of himself or herself. To record the second video, the user may move the client computing device in various directions to capture some portion of the user as discussed above with regard to FIGS. 4A and 4B.

New 3D depth data may be generated using the second video or the original video. In the case of using the original video, the user does not have to capture a second video. As discussed above, structure from motion techniques may be implemented to generate the new depth data. The second or original video may be processed to identify 3D points corresponding to the user. In addition, data from one or more of a geographic position device, accelerometer, gyroscope, etc. may also be used.

After or before generating the new depth data, the pre-stored depth data may be retrieved again. As discussed above, the pre-stored depth data may be retrieved from local or remote storage. Using the new generated depth data and pre-stored depth data, the tertiary authentication may be performed by comparing the pre-stored and new generated depth data in order to authenticate the user. For example, new 3D points of the new generated depth data may be compared with 3D points corresponding to the pre-stored depth data. As another example, a plurality of 3D points of the new generated and pre-stored depth data may be compared to create a more comprehensive assessment. This depth data comparison and authentication may be similar to the examples above with regard to the first attempt of the primary authentication.

If the tertiary authentication is successful, then the user may be granted access to the protected features or information associated with the device. FIG. 6 is an example 600 of a message that may be displayed on the client computing device 120 when the primary authentication is successful. The message may notify the user that the second primary authentication has succeeded and access to the requested protected information or features has been allowed. In some examples, if the user was attempting access to a particular application or personal information, a similar message may be conveyed by the client computing device. As another example, no message may be displayed and the user will simply be granted access to the desired feature.

Alternatively, if the tertiary authentication is not successful, then the user may be denied access to the requested protected information or features. As discussed above, FIG. 8 is an example 800 including a message that may be displayed on the client computing device 120 when the second primary authentication is unsuccessful. The message may notify the user that the second primary authentication has failed and access to the requested protected information or features has been denied.

In an alternative embodiment, rather of capturing a video, a plurality of still images may be captured by a mobile client computing device from at least slightly different positions relative to the face of the user. For example, as part of the primary authentication, the user may be prompted to capture a plurality of still images rather than the video. Once the user has selected to do so, the camera of the user's client computing device, such as client computing device 120 or 130, may capture a series of still images, for example periodically, as the user moves the computing device around his or her face, as illustrated in the examples of FIGS. 4A and 4B. After the plurality of still images are captured, depth data may be generated based on the plurality of still images as described above with regard to the video examples. Then, based on the generated depth data the primary authentication can be performed. In addition, the secondary authentication may be performed by using one of the plurality of still images. Again, if the tertiary authentication is performed, depth data may be generated again using the plurality of still images or by capturing a new plurality of still images and using these to generating new depth data as described above. Similarly, rather than using a video in order to generate the pre-stored depth data, a plurality of still images may be captured as part of an initial set up and used to generate the pre-stored depth data. In some examples, one of these plurality of still images used to generate the pre-stored depth data may also be used as the pre-stored image.

FIG. 9 is an example 900 flow diagram of some aspects that were described above, which may be performed by one or more computing devices, such as the client computing devices 120, 130, 140, and/or server computing devices 110. In this example, a computing device receives a request to access a protected feature at block 902. The computing device then receives a plurality of images from a user at block 904. In this regard, the plurality of images may be image frames of a captured video or a plurality of still images. The computing device then generates depth data based at least in part on the plurality of images at block 906. Based on the generated depth data, the computing device will compare the depth data to pre-stored depth data corresponding to the user in order to authenticate the user as part of a primary authentication at block 908. A decision is made at block 910 whether authentication is successful.

If authentication is successful, then the user is granted access to the computing device, as shown at block 924. Alternatively, if authentication is unsuccessful, then the computing device may compare an image to a pre-stored image of the user in order to authenticate the user as part of a secondary authentication at block 912. A decision is made at block 914 whether the secondary authentication is successful. If authentication is unsuccessful, then access to the protected feature is denied at block 918.

If authentication is successful, then new depth data corresponding to the user's face is generated at block 916. Based on the new depth data, the computing device compares the new depth data to the pre-stored depth data in order to authenticate the user as part of a tertiary authentication at block 920. A decision is made at block 922 whether this authentication was successful. If authentication of the new generated depth data is unsuccessful, then the user may be denied access to the information or feature of the computing device at block 918. Alternatively, if authentication is successful, then the user may be granted access to the information or feature of the computing device at block 924.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for authenticating a user, the method comprising:
   receiving, by one or more computing devices, a request for access to a protected feature;
   generating, by the one or more computing devices, depth data based at least in part on a plurality of images;
   comparing, by the one or more computing devices, the depth data to pre-stored depth data corresponding to the user in order to authenticate the user as part of a primary authentication;
   when the user is not authenticated as part of the primary authentication, identifying, by the one or more computing devices, a single image;
   comparing, by the one or more computing devices, the identified image to a pre-stored image of the user in order to authenticate the user as part of a secondary authentication;
   when the user is authenticated as part of the secondary authentication, generating, by the one or more computing devices, new depth data corresponding to the user;
   comparing, by the one or more computing devices, the new depth data to the pre-stored depth data in order to authenticate the user as part of a tertiary authentication;
   when the user is authenticated as part of the tertiary authentication, providing, by the one or more computing devices, access to the protected feature.

2. The method of claim 1, wherein the plurality of images are image frames from a captured video.

3. The method of claim 1, wherein the new depth data is generated based on the plurality of images.

4. The method of claim 1, further comprising:
   receiving a second plurality of images of the user; and
   generating the new depth data based on the received second plurality of images.

5. The method of claim 1, wherein, when the identified single image is not authenticated, denying access to the protected feature of the client device.

6. The method of claim 1, wherein, when the new generated depth data as part of the tertiary authentication is not authenticated, denying access to the protected feature of the client device.

7. The method of claim 1, wherein identifying the identified single image includes selecting an image from the plurality of images.

8. The method of claim 1, wherein identifying the identified single image includes requesting an image of the user and receiving the single image in response to the request.

9. A system comprising one or more computing devices configured to:
   receive a request for access to a protected feature;
   generate depth data based at least in part on a plurality of images;
   compare the depth data to pre-stored depth data corresponding to the user in order to authenticate the user as part of a primary authentication;
   when the user is not authenticated as part of the primary authentication, identify a single image;
   compare the identified image to a pre-stored image of the user in order to authenticate the user as part of a secondary authentication;
   when the user is authenticated as part of the secondary authentication, generate new depth data corresponding to the user;
   compare the new depth data to the pre-stored depth data in order to authenticate the user as part of a tertiary authentication;
   when the user is authenticated as part of the tertiary authentication, provide access to the protected feature.

10. The system of claim 9, wherein the plurality of images are image frames from a captured video.

11. The system of claim 9, wherein the new depth data is generated based on the plurality of images.

12. The system of claim 9, wherein the one or more computing devices are further configured to:
   receive a second plurality of images of the user; and
   generate the new depth data based on the received second plurality of images.

13. The system of claim 9, wherein, when the identified single image is not authenticated, denying access to the protected feature of the client device.

14. The system of claim 9, wherein, when the new generated depth data as part of the tertiary authentication is not authenticated, denying access to the protected feature of the client device.

15. The system of claim 9, wherein identifying the identified single image includes selecting an image from the plurality of images.

16. The system of claim 9, wherein identifying the identified single image includes requesting an image of the user and receiving the single image in response to the request.

17. A non-transitory tangible computer-readable storage medium on which computer readable instructions of a program are stored, the instructions, when executed by one or more processors, cause the one or more processors to perform a method, the method comprising:
   receiving, by one or more computing devices, a request for access to a protected feature;
   generating, by the one or more computing devices, depth data based at least in part on a plurality of images;
   comparing, by the one or more computing devices, the depth data to pre-stored depth data corresponding to the user in order to authenticate the user as part of a primary authentication;
   when the user is not authenticated as part of the primary authentication, identifying, by the one or more computing devices, a single image;
   comparing, by the one or more computing devices, the identified image to a pre-stored image of the user in order to authenticate the user as part of a secondary authentication;
   when the user is authenticated as part of the secondary authentication, generating, by the one or more computing devices, new depth data corresponding to the user;
   comparing, by the one or more computing devices, the new depth data to the pre-stored depth data in order to authenticate the user as part of a tertiary authentication;
   when the user is authenticated as part of the tertiary authentication, providing, by the one or more computing devices, access to the protected feature.

18. The medium of claim 17, wherein the plurality of images are image frames from a captured video.

19. The medium of claim 17, wherein the new depth data is generated based on the plurality of images.

20. The medium of claim 17, further comprising:
   receiving a second plurality of images of the user; and
   generating the new depth data based on the received second plurality of images.

* * * * *